(12) United States Patent
Stomski

(10) Patent No.: US 7,023,339 B2
(45) Date of Patent: Apr. 4, 2006

(54) TRANSPORTABLE SECURITY PORTAL FOR SCREENING POTENTIAL TERRORISTS

(76) Inventor: Gerald D. Stomski, 54 Washington Rd., Woodbury, CT (US) 06798

( * ) Notice: Subject to any disclaimer, the term of this patent is extended or adjusted under 35 U.S.C. 154(b) by 66 days.

(21) Appl. No.: 10/822,917

(22) Filed: Apr. 13, 2004

(65) Prior Publication Data

US 2005/0237178 A1 Oct. 27, 2005

(51) Int. Cl.
*G08B 21/00* (2006.01)
(52) U.S. Cl. .............. 340/540; 109/3; 109/26; 109/64; 160/351; 340/551
(58) Field of Classification Search .......... 340/540, 340/999, 551; 109/3, 26, 49.5, 58, 64; 116/DIG. 9; 160/351
See application file for complete search history.

(56) References Cited

U.S. PATENT DOCUMENTS

| | | | |
|---|---|---|---|
| 3,814,016 A * | 6/1974 | Leach et al. ............. 102/303 |
| 4,586,441 A | 5/1986 | Zekich |
| 4,773,338 A | 9/1988 | Hastings |
| 5,039,981 A * | 8/1991 | Rodriguez .............. 340/551 |
| 5,195,448 A | 3/1993 | Sims |
| 5,600,303 A * | 2/1997 | Husseiny et al. ......... 340/568.1 |
| 5,769,257 A * | 6/1998 | Fleisher et al. ............ 109/79 |
| 5,915,449 A * | 6/1999 | Schwartz ................ 160/330 |
| 6,308,644 B1 | 10/2001 | Diaz |
| 6,474,599 B1 | 11/2002 | Stomski |
| 6,484,650 B1 | 11/2002 | Stomski |
| 6,724,304 B1 * | 4/2004 | Risi ...................... 340/540 |
| 6,790,249 B1 * | 9/2004 | Davies ..................... 55/340 |
| 6,886,299 B1 * | 5/2005 | Gower ................... 160/368.1 |
| 2003/0213184 A1 * | 11/2003 | Hunt et al. ............... 52/36.1 |
| 2004/0232054 A1 * | 11/2004 | Brown et al. ............. 209/552 |

* cited by examiner

*Primary Examiner*—Thomas Mullen
(74) *Attorney, Agent, or Firm*—Malcolm J. Chisholm, Jr.

(57) ABSTRACT

The security portal (10) is dimensioned to be readily mounted and transported on a trailer (54) alone as a single security portal (10) or with a plurality of security portals to provide screening for a short term, high security event. The portal (10) includes bullet-resistant, bomb-blast proof and at least partially transparent walls (12, 14, 16, 18) and doors (22, 24, 26). Monitors (32, 34) are secured to the portal (10) for monitoring an individual within an interior (30) of the portal (10) for detecting weapons, bio-hazards, chemical toxins, illegal drugs, contraband, or other hazardous materials. The security portal also includes a security monitoring station (36) adjacent the security access door (26) and a bomb-blast enclosure (66) having a flap (68) and bomb-blast containment balloon (70) for containing hazardous materials in the event of a bomb-blast within the portal (10).

16 Claims, 3 Drawing Sheets

TRANSPORTABLE SECURITY PORTAL FOR SCREENING POTENTIAL TERRORISTS

TECHNICAL FIELD

The present invention relates to apparatus for screening individuals passing from non-secure areas into secure areas, and in particular relates to a transportable, small security portal that may be readily moved as a single portal or along with a plurality of identical security portals to a high security event, such as a visit by a well-known government dignitary, or major sporting events, such as the Olympics, Super Bowl, etc.

BACKGROUND ART

It is well known that, in the wake of the terrorist attacks of Sep. 11, 2001 in New York City, Washington, DC and Pennsylvania, heightened security concerns have given rise to new solutions to the many problems associated with screening individuals to prevent terrorist activities. The present inventor has provided one such solution that is disclosed in U.S. Pat. No. 6,484,650 that issued on Nov. 26, 2002 to Stomski, which Patent is incorporated herein by reference.

That patent shows a security system for queues or lines of individuals, such as airline passengers, awaiting screening to move from an un-secure airport area into a secure boarding area. The system includes a series of adjacent, bullet-resistant, transparent chambers having a door interlock system so that an individual may enter an entry chamber, and progress through the series of chambers while being progressively screened. Simultaneously,: a conveyor in an adjacent surveillance chamber moves the individual's personal belongings along through an X-ray device while the individual is monitored and screened for weapons, etc. The door interlock system provides for rapid movement of the individual through the series of chambers, but restricts exit from the chambers during monitoring. If the individual is found to be carrying or transporting weapons, or otherwise presents a security risk, the individual may be moved through an outer access door by security personnel, while other individuals progress through the chambers.

Many other security systems are known that include restricted entry and exit chambers, such as shown in U.S. Pat. No. 6,308,644, U.S. Pat. No. 5,195,448, U.S. Pat. No. 4,586,441, and U.S. Pat. No. 4,773,338. While these provide for isolating a potential terrorist during a screening search, because of the limited mobility and structural limitations of such known security systems, the systems are of virtually no or limited value in screening individuals at areas of a high security demand for a limited period of time, such as an area receiving a visit by a head of state, etc.

Additionally, no known security systems also provide for rapid screening of potential terrorists as well as containment of hazardous materials a terrorist may seek to unleash in a "suicide attack". For example, the well-known anthrax attacks on the U.S. Senate Office buildings of the Fall and Winter of 2001–2002 presented an enormous security risk of a microscopic bio-hazard. If such a lethal contaminant were to be carried into a high security area with a temporary high population density and unleashed by a suicide bomber, the results could very well be catastrophic. Moreover, other known microscopic substances, such as toxic bacteria or viruses, cyanide, and similar toxic, chemical compounds, may be utilized as weapons against high security targets by suicidal fanatics. (For purposes of convenience herein, all such bio-hazard materials, toxic chemical compounds, explosives or any other materials that pose a risk to humans and that may be dispersed by terrorists by any means for purposes of terror, and also including illegal drugs or contraband, will hereinafter be characterized for convenience as "hazardous materials".)

Consequently, there is a need for a security screening apparatus that may be readily transported to areas of a short-term, high security demand, and that may be provided to support screening potential terrorists at the areas including a small to a very large number of individual attendees. There is also a need for a security apparatus that can not only screen potential terrorists, but that can also contain any hazardous materials transported by potential terrorists upon detection of the hazardous materials to prohibit contamination of the area of high security demand by the detected hazardous materials.

DISCLOSURE OF INVENTION

The invention is a transportable security portal for screening potential terrorists, wherein the security portal is sufficiently small and light to be readily mounted and transported on a trailer alone as a single security portal or with a plurality of security portals. Alternatively, the security portal may, be transported to and semi-permanently secured to one area for security screening of potential terrorists.

Each security portal includes bullet-resistant and bomb-blast proof walls and doors that may be completely transparent or that are at least partially transparent. The doors and walls are cooperatively secured to each other to define an interior of the security portal. The doors include at least an entry door, an exit door and a security access door. Monitors are secured to the portal for monitoring an individual within the interior of the security portal for detecting weapons or hazardous materials. The security portal also includes a security monitoring station adjacent the security access door that is dimensioned to house security personnel to monitor the individual within the interior of the security portal between the entry and exit doors.

A bomb-blast enclosure is secured in direct communication with the interior of the security portal and includes a bomb-blast flap and an expandable bomb-blast containment balloon. The balloon is secured so that, upon detonation of a bomb within the interior of the security portal, the bomb-blast flap opens by expansion of bomb-blast generated gases thereby permitting passage of bomb-blast gases and any hazardous materials through the bomb-blast enclosure past the bomb-blast flap and into the, bomb-blast containment balloon that rapidly expands outside of the security portal for containment within the bomb-blast balloon of the bomb-blast gases and any hazardous materials. A door lock controller controls locking and unlocking of the entry, exit, and security access doors so that the individual within the interior of the security portal may not exit the portal during monitoring of the individual.

In a preferred embodiment, the security portal includes a positive draft ventilation-filtration system that directs all air within the interior of the security portal through a microscopic particle filter in order to filter out hazardous materials from the air and prohibit transmission of any such filtered hazardous materials from the ventilation-filtration system into the area around the security portal. The monitors may position detection sensors within the ventilation-filtration system. In another embodiment, a personal-belongings conveyor receives and passes personal belongings of the individual through the security monitoring station and through a monitoring apparatus for detecting hazardous materials within the personal belongings.

In a further embodiment, the security monitoring station may be collapsible, including a floor, walls and a roof that fold down, or are readily disassembled, for ease of storage near the security portal, such as for example, under a floor of the portal to facilitate transport of the portal on a trailer. In such an embodiment, the personal-belongings conveyor may be stored within the interior of the security portal.

Accordingly, it is a general purpose of the present invention to provide a transportable security portal for screening potential terrorists that overcomes deficiencies of the prior art.

It is a more specific purpose to provide a transportable security portal for screening potential terrorists that may be readily transported to areas of a short-term, high security demand in order to screen potential terrorists.

It is an additional object to provide a transportable security portal that can also contain any hazardous materials transported by potential terrorists upon detection of the hazardous materials to prohibit contamination of the area of high security demand by the detected hazardous materials.

These and other purposes and advantages of the present transportable security portal will become more readily apparent when the following description is read in conjunction with the accompanying drawings.

DESCRIPTION OF THE PREFERRED EMBODIMENTS

Figure 3:
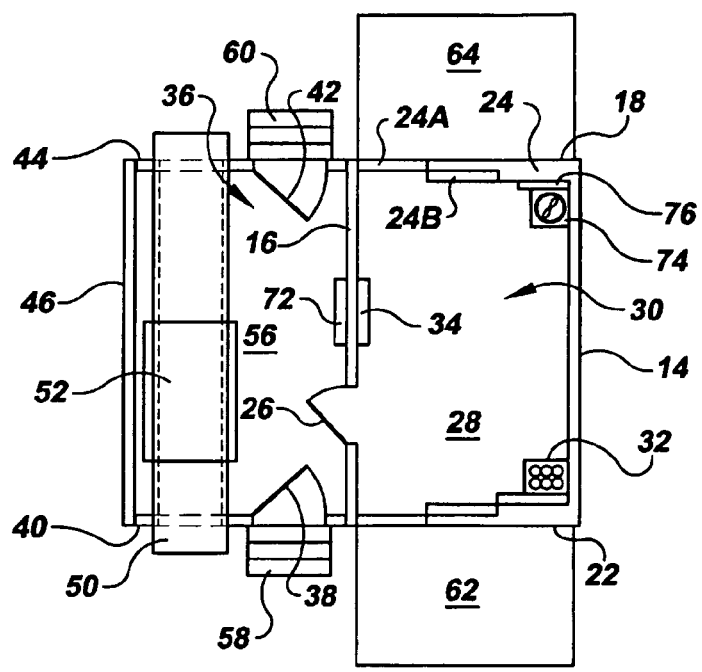
FIG. 3 is a top schematic floor-plan view of the FIG. 1 security portal showing an interior of the security portal and an adjacent security chamber.

Referring to the drawings in detail, a transportable security portal for screening potential terrorists is shown and generally designated by the reference numeral 10. The security portal 10 includes a portal entry wall 12, a first side portal wall 14 and an opposed second side portal wall 16 (shown in FIG. 3), a portal exit wall 18, and a roof 20. The portal entry wall 12 includes a portal entry door 22, that may be a sliding door including a first sliding panel 22A, and a second sliding panel 22B, and having a manual or automated opening mechanism, as disclosed in the aforesaid, incorporated U.S. Pat. No. 6,484,650, or may be any kind of door known in the art to be capable of being bullet-resistant and locked for security purposes recited herein. The portal exit wall 18 includes a portal exit door 24, that, like the front portal door 22, may be a sliding door including a first sliding panel 24A, and a second sliding panel 24B, and that may also have a manual or automated opening and closing mechanism. The second side portal wall 16 includes a security access door 26 that may be automated, sliding or pivoting, and lockable as with the entry and exit doors 22, 24. As best shown in FIG. 3, the portal entry, exit and side walls 12, 18, 14, 16 and roof 20 are cooperatively secured together with a portal floor 28 to define an interior 30 of the security portal 10.

The portal entry wall 12, exit wall 18 and opposed side walls 14, 16 are constructed of bullet-resistant and bomb-proof material to become bullet-resistant. In a preferred embodiment, the portal roof 20 and portal floor 28 may also be constructed of bullet-resistant and bomb-blast proof materials. For purposes herein, the phrase "bullet-resistant" is to mean that the described structural component prohibits penetration of a bullet that may be fired from any weapon that can be held by an individual being monitored within the interior 30 of the security portal 10. The phrase "bomb-blast proof" is to mean that the assembled portal 10 will not be structurally damaged by any bomb-blast from a bomb capable of being carried by an individual being monitored within the interior 30 of the portal 10. In addition, the portal entry wall 12, exit wall 18 and opposed side walls 14, 16 are also preferably constructed of transparent materials, such as bullet-resistant glass or plastic, or are at least partially transparent. By the phrase "partially transparent", it is meant that, for example, the entry door 22 and the exit door 24 may include bullet proof windows (not shown), while the remainder of the entry wall 12, and exit wall 18 are non-transparent. It has been determined that screening of individuals is facilitated by permitting the individuals to view into and through a security screening portal 10 or similar chamber. Individuals are not comfortable walking into a non-transparent, "elevator-like", enclosure. Therefore, in a preferred embodiment of the present security portal 10, all of the vertical walls 12, 14, 16, 18 are transparent, or partially transparent. However, in a minimum comfort embodiment, only the portal entry wall 12 and portal exit wall 18 are transparent, or partially transparent, such as the portal 10 having bullet-resistant windows in the entry and exit walls 12, 18, such as within the entry and exit doors 22, 24.

The security portal 10 also includes monitoring means for monitoring an individual (not shown) within the interior 30 of the portal 10 for detecting weapons or hazardous materials in the possession of the individual. The monitoring means may consist of sensors 32 (shown in FIG. 3) located within the interior 30 of the portal 10, or may consist of those sensors 32 combined with remote sensors 34 partially within the interior 30 and partially within a security monitoring station 36 adjacent the second side wall 16, such as infra-red cameras, chemical detectors, metal scanners, etc., or the monitoring means may consist of any apparatus known in the art of security screening.

Figure 1:
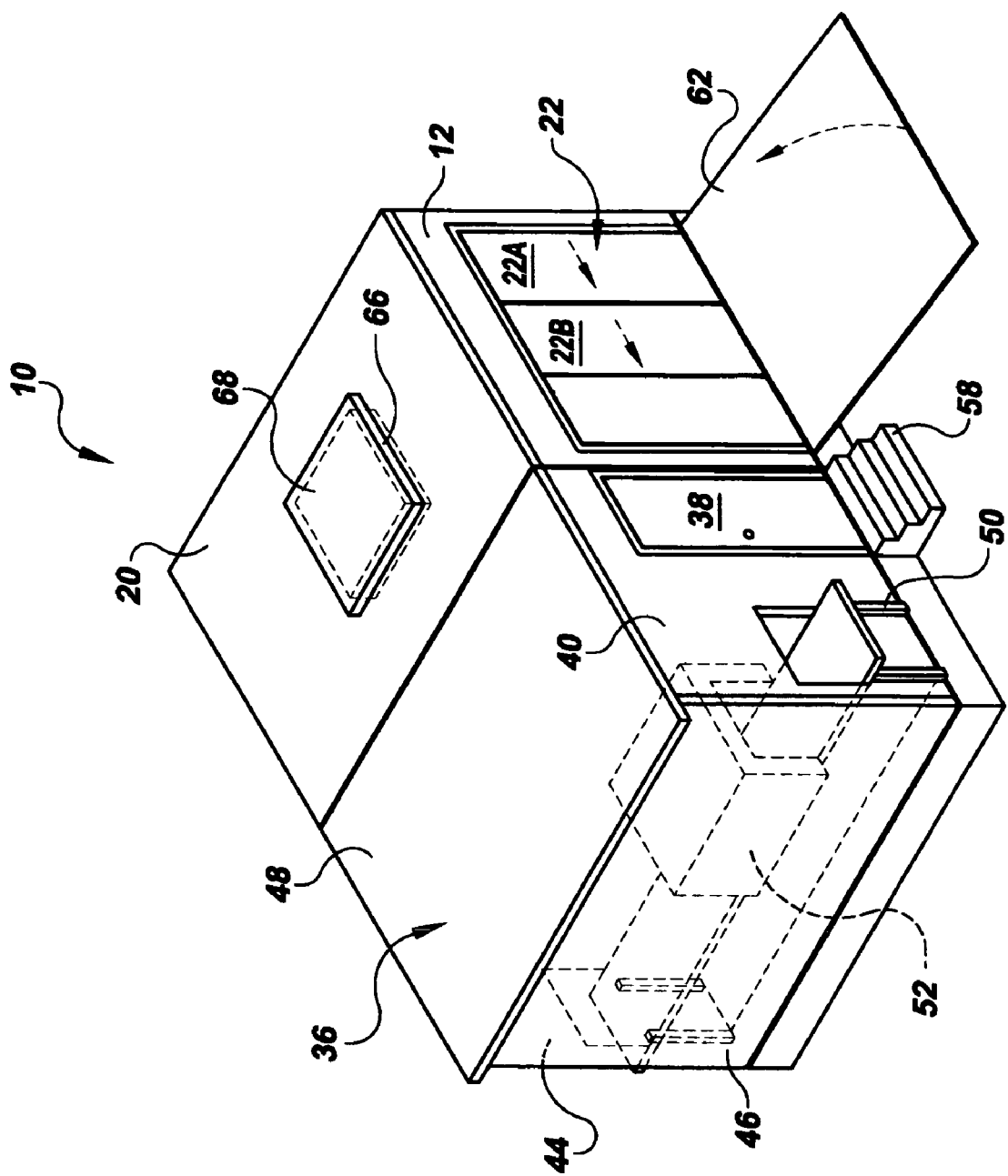
FIG. 1 is a front perspective view of a transportable security portal for screening potential terrorists constructed in accordance with the present invention showing entry doors to an interior of the portal and to a security chamber.

The security monitoring station 36 may include a security entry door 38 within a security front wall 40, a security exit door 42 within a security exit wall 44, and a security side wall 46 between the entry and exit walls 40, 44 and opposed to the second side wall 16. As best shown in FIG. 3, the security access door 26 is defined to permit access between the security monitoring station 36 of the portal 10 and the interior 30 of the portal 10. The security monitoring station 36 also includes a roof 48 (shown best in FIGS. 1 and 2). The security monitoring station 36 may also include a personal-belongings conveyor 50 that is dimensioned to extend through the security monitoring station 36 so that individuals being screened in the interior 30 of the portal 10 may, prior to entering the portal 10, deposit their personal belongings on the conveyor 50. The personal belongings (not shown) would then progress through the security monitoring station 36 as the individual is being monitored within the interior 30 of the portal 10. Security personnel (not shown) may physically inspect the personal belongings, and/or a personal belongings monitoring device 52, such as an X-ray machine, or a metal detector, or any luggage monitoring apparatus known in the art, would also inspect the personal belongings in a manner known in the security art.

Figure 4:
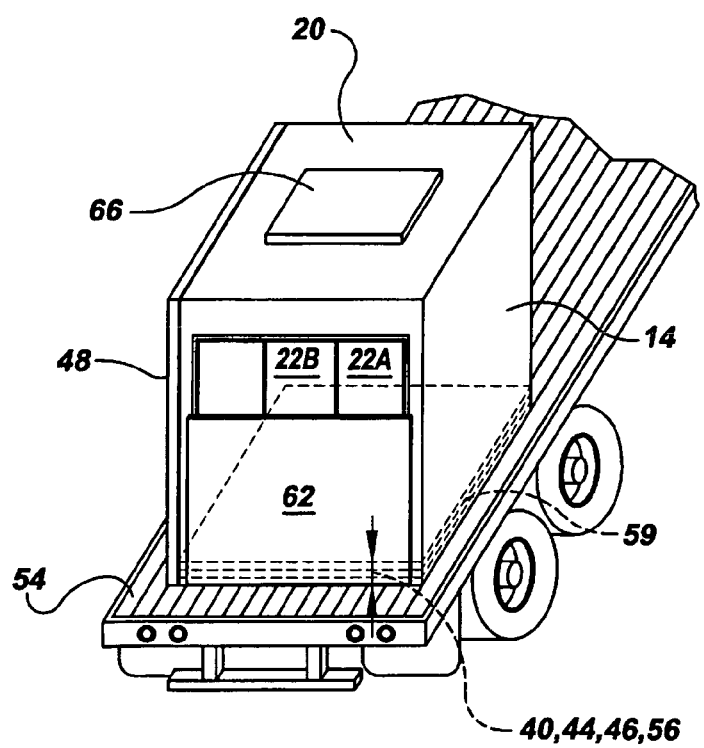
FIG. 4 is a perspective view of a transportable security portal mounted on a trailer in a transportation mode.

The security monitoring station 36 is preferably constructed to be easily disassembled and stored to facilitate transport of the security portal 10. To achieve that, the personal belongings conveyor 50 and personal belongings monitoring device 52 are constructed and dimensioned to be easily removed from the security monitoring station 36 and stored for transport within the interior 30 of the portal 10, or within a storage compartment (not shown) of a transporting trailer 54 (shown in FIG. 4). Additionally, and for convenience, the security entry wall 40 may be constructed to pivot downward onto a security monitoring station floor 56 (shown in FIG. 3), and the security side wall 46 and security exit wall 44 may similarly be constructed to pivot onto the floor 56. The collapsed walls 40, 46, 42 and floor 56 may then be constructed to slide into a portal floor cavity 59 (shown in FIG. 4) defined beneath the floor 28 of the security portal 10 to facilitate transport on a standard freight trailer. The roof 48 of the security monitoring station 36 may be constructed of flexible "awning" types of material, or in the alternative, may be constructed to pivot from the security monitoring station roof 20 down adjacent the second side wall 16 of the portal 10, as shown in FIG. 4.

Access steps 58 and exit steps 60 are secured adjacent the security entry door 38 and the security exit door 44. Also, a portal access ramp 62 is secured adjacent the portal entry door 22, and a portal exit ramp 64 is secured adjacent the portal exit door 24, and the portal ramps 62, 64 may be pivotally secured to the portal 10 so that they may be pivoted upward for efficiency of storage for transport of the security portal 10. The portal access ramp 62 and portal exit ramp 64 are dimensioned to provide ease of entry and exit from the security portal 10 whenever the portal 10 is mounted upon a trailer 54, as shown in FIG. 4, depending upon the height of the trailer 54 above the ground. The portal access and exit ramps 62, 64 may also include handrails (not shown), and may be "L" shaped to facilitate movement from the portal 10 back to the ground.

Figure 2:
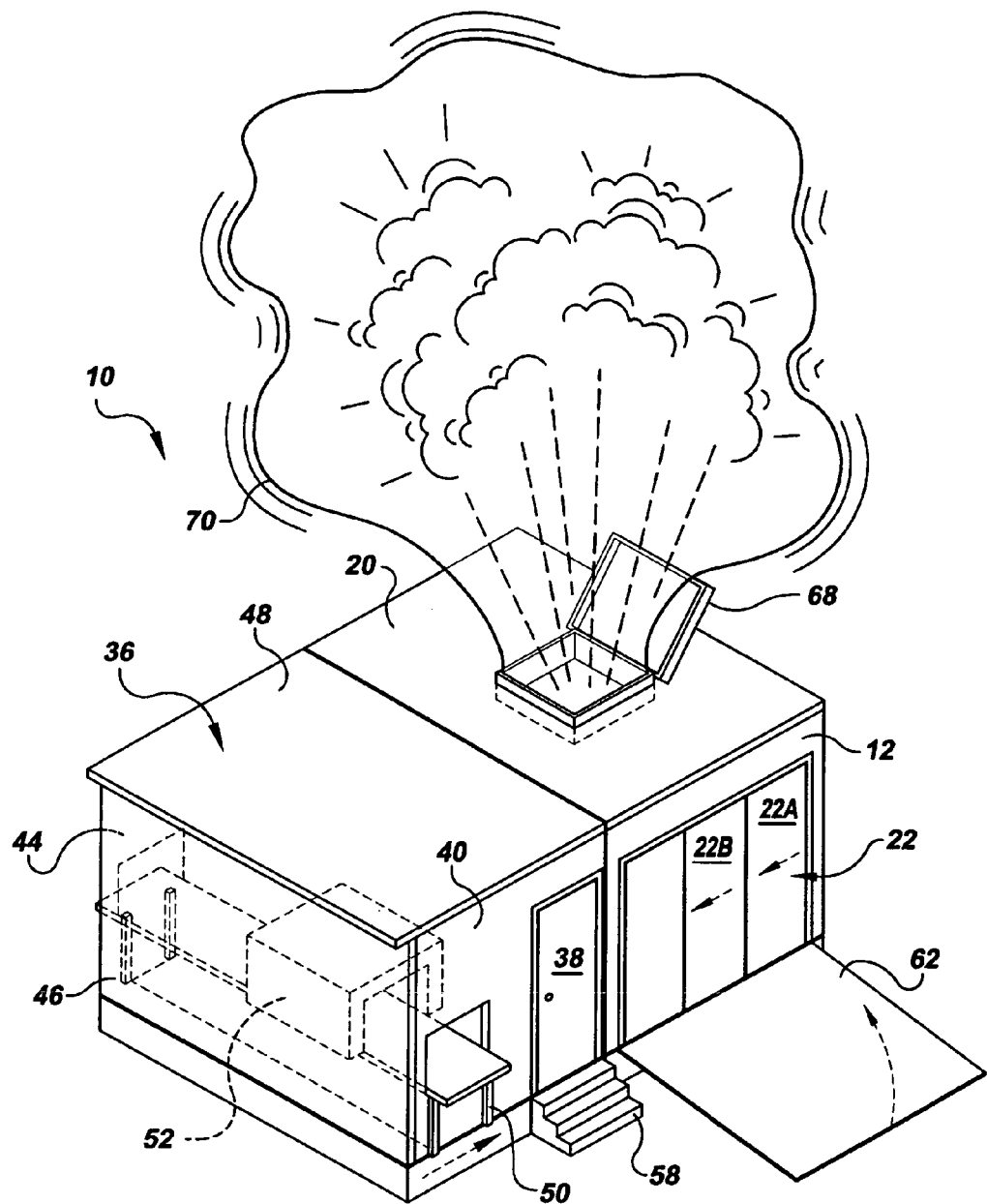
FIG. 2 is a front perspective view of the FIG. 1 transportable security portal showing a bomb-blast containment balloon extending out of a bomb-blast enclosure secured to the security portal.

The security portal 10 also includes a bomb-blast enclosure 66 that is secured to the portal 10, preferably to the roof 20 of the portal 10. The bomb-blast enclosure 66 includes a bomb-blast flap 68 and an expandable bomb-blast containment balloon 70 secured within the enclosure 66, under the flap 68. The bomb-blast containment balloon is secured within the enclosure 66 so that, upon detonation of a bomb within the interior 30 of the portal 10, rapidly expanding bomb-blast gasses force the bomb-blast flap 68 to open, as shown in FIG. 2, and the bomb-blast containment balloon 70 expands out of the enclosure 66 past, the flap 68 to contain the bomb-blast gases and any hazardous materials within the bomb-blast gases. This containment prohibits escape of any hazardous materials out of the security portal into the area of heightened security.

It is feared that at areas of high security, such as spectacular sporting events (e.g. the "Super Bowl", or "Olympics") or visits by the President of the United States, etc., a terrorist may attempt to unleash super-lethal, weaponized bacteria, viruses, or other hazardous materials. By use of the described bomb-blast enclosure 60, if such a terrorist is effectively monitored while within the interior 30 of the portal 10 and upon detection of the described hazardous material, elects to unleash it by any sort of explosive device rather than be taken prisoner, the security portal 10 will effectively prohibit escape of the hazardous material from the security portal 10.

The security portal 10 also includes a door controller means 72 for controlling locking and unlocking of the portal entry door 22, the portal exit door 24, and the security access door 26 so that the individual within the interior 30 of the portal 10 may not exit the portal during monitoring, and so that any security personnel within the security monitoring station 36 may enter and exit the interior 30 of the security portal whenever they desire but the individual being monitored may not open the security access door 26 during monitoring. The lock controller means 72 may be any controller known in the security art, such as the lock controller means disclosed in the aforesaid U.S. Pat. No. 6,484,650. The lock controller means 72 may also be constructed to be operated by a security personnel, or may be integrated with the monitoring means to be operated automatically by a common controller known in the art for automated operation of the security portal 10 without any security personnel.

The security portal 10 may also include a positive draft ventilation-filtration system 74 secured in fluid communication with the interior 30 of the portal 10 that directs all air within the interior 30 through a microscopic particle filter within the system 74. The ventilation-filtration system thereby filters out any hazardous materials from the air within the interior 30 of the portal 10 to prohibit escape of such particles of hazardous material out of the portal 10. If such particles of hazardous material have been blasted into the bomb-blast containment balloon 70, then the security portal 10 may utilize the positive draft ventilation-filtration system 74 to pull such particles from the balloon through the filter to prohibit transmission of the particles out of the portal 10.

The positive draft ventilation-filtration system 74 may be any ventilation-filtration system means known in the art for cleansing air-borne particles from an enclosure, such as are commonly used in biological laboratories (not shown) that must examine lethal microscopic particles, such as anthrax spores, small pox spores, etc. Prior to the air passing through the ventilation-filtration system 74 being passed out into the ambient atmosphere, the air may be heated beyond a kill temperature for biological hazards, such as a kill temperature for anthrax and small pox spores, to thereby sterilize the air.

Additionally, the sensors 32 of the monitoring means may be completely or partially placed within, or otherwise integrated with the ventilation-filtration system 74 so that the air passing through the system 74 also passes by the sensors 32. By this arrangement, the sensors 32 have enhanced sensing capacity, and may also be integrated with the ventilation-filtration system 74 to trigger it to terminate flow of air out of the security portal 10 until the ventilation-filtration system 74 is capable of sterilizing the air through heating if biological hazardous materials are detected. Through integration of the positive draft ventilation-filtration system 74 with the security portal 10, the portal 10 is able to achieve both enhanced screening of individuals, and enhanced containment of any hazardous materials detected within the interior 30 of the sensor portal 10.

The security portal 10 may also include a back-up power generator as well as a battery system 76 (shown together schematically in FIG. 3 at reference numeral 76) for providing electrical power to operate the monitoring means, lock controller, lighting and any other component of the portal 10 needing power in the event of failure or interruption of the ordinary electrical line power supplied to the security portal 10 from standard street electrical utility lines. The back-up power generator and battery system 76 includes an electrical generator, such as any portable electrical generator known in the art that is capable of operating the described portal 10 systems. A storage battery 76 is also included as part of the back-up system 76 for storing adequate electrical energy to operate the security portal for a predetermined interval. It is feared that an organized terrorist assault may endeavor to interrupt normal electrical line power delivered to the security portal 10 in order to breach security screening for a high security event. By use of the back-up power generator and battery system 76, any such interruption of electrical line power to the security portal 10, by act of terrorists or by an electrical storm, etc., would not stop operation of the security portal 10. In addition, while the portal entry door 22 exit door 24 and/or the security access door 26 would have manual overrides of their locks, the back-up power generator and battery system 76 would also provide for a continued monitoring and controlled unlocking for exit of any individual within the interior 30 of the security portal during an interruption of ordinary electrical line power delivery to the portal 10.

FIG. 4 shows the security portal 10 positioned on a trailer 54 with the security monitoring station entry wall 40, security exit wall 44 and security side wall 46 collapsed onto the security monitoring station floor 56 and positioned within the portal floor cavity 59. The security monitoring station roof 48 is also pivoted downward to be secured adjacent the second side wall 16 of the security portal 10. The trailer 54 may be a standard trailer utilized to move various sizes of freight, or may be customized to efficiently accommodate the security portal 10 by having special storage containers (not shown) for components of the portal 10, or by having special ramps and/or handrails, etc. to facilitate usage of the portal.

It can be seen that the transportable security portal 10 provides for an extremely efficient screening of potential terrorists at areas of high security where screening of potential terrorists typically presents grave risks. For high security events, a plurality of virtually identical security portals may be readily transported to a security screen between an unsecure and secure area for screening attendees of the events. After usage, the security portals could then be readily transported back to temporary storage, or to another high security event to be dispersed based upon specific demands of, particular events. Additionally, one or more of the security portals 10 may be moved to a security screen to be removed from their transporting trailers or other freight vehicles for temporary or permanent installation at a security screen. This provides for rapid and efficient deployment of ready-to-use, highly efficient security portals 10 to respond to a new security risk, or a new security area.

While the present invention has been disclosed with respect to the described and illustrated embodiments of a transportable security portal for screening potential terrorists, it is to be understood that the invention is not to be limited to those embodiments. For example, while the security portal 10 is shown as a stand-alone, self sufficient screening apparatus, it is to be understood that the portal 10 could also be integrated with other screening apparatus as part of an extremely high intensity security screen. Accordingly, reference should be made primarily to the following claims rather than the foregoing description to determine the scope of the invention.

What is claimed is:

1. A transportable security portal (10) for screening potential terrorists, the portal (10) comprising:
   a. a portal entry wall (12), a portal exit wall (18), opposed portal side walls (14, 16) and a roof (20) cooperatively secured to each other to define an interior (30) of the security portal (10), the entry, exit and side walls (12, 18, 14, 16) being bullet-resistant, bomb-blast-proof and at least partially transparent, and including a portal entry door (22), a portal exit door (24) and a security access door (26);
   b. monitoring means including sensors (32, 34) for monitoring an individual within the interior (30) of the security portal (10) for detecting weapons and hazardous materials;
   c. a security monitoring station (36) adjacent the security access door (26) dimensioned to house security personnel to monitor the individual within the interior (30) of the security portal (10);
   d. a bomb-blast enclosure (66) secured to the security portal (10) including a bomb-blast flap (68) and an expandable bomb-blast containment balloon (70) secured within the enclosure (66) 50 that upon detonation of a bomb within the interior (30) of the security portal (10) the bomb-blast flap (68) opens by expansion of bomb-blast generated gases thereby permitting passage of bomb-blast gases and any hazardous materials through the bomb-blast enclosure (66) past the bomb-blast flap (68) and into the bomb-blast containment balloon (70) outside of the security portal (10) for containment within the bomb-blast balloon (70) of the bomb-blast gases and any hazardous materials; and,
   e. a door lock controller means (72) for controlling locking and unlocking of the portal entry door (22), portal exit door (24), and security access door (26) 50 that the individual within the interior (30) of the security portal (10) may not exit the portal (10) during monitoring of the individual.

2. The transportable security portal (10) of claim 1, further comprising a positive draft ventilation-filtration system (74) secured in fluid communication with the interior (30) of the portal (10) for directing all air within the interior (30) of the portal (10) through a microscopic particle filter within the system (74).

3. The transportable security portal (10) of claim 1, wherein sensors (32) of the monitoring means are at least partially secured within a ventilation-filtration system for detecting harmful materials within the air passing through the ventilation-filtration system.

4. The transportable security portal (10) of claim 1, further comprising a personal belongings conveyor (50) secured within the security monitoring station (36) including a personal belongings monitoring device (52) adjacent the conveyor (50) for monitoring personal belongings moving along the conveyor (50).

5. The transportable security portal (10) of claim 1, further comprising the security portal (10) being mounted upon a trailer (54) for facilitating transport of the portal (10) to an area of high security demand.

6. The transportable security portal (10) of claim 1, further comprising a backup power generator and battery system (76) secured to the portal (10) for supplying electricity to the portal (10) whenever electricity is not available from utility lines.

7. The transportable security portal (10) of claim 1, wherein the security monitoring station (36) includes a security entry wall (40), a security exit wall (44), and a security side wall (46) that are pivotally secured to a security monitoring station floor (56), and the security portal (10) defines a portal floor cavity (59) dimensioned to receive the security entry wall (40), security exit wall (44), security side wall (46) and security monitoring station floor (56) whenever the security entry wall (40), exit wall (44), and side wall (46) are pivoted onto the security monitoring station floor (56).

8. The transportable security portal (10) of claim 7, wherein the security monitoring station (36) includes a security roof (48) that is pivotally secured to a side wall (16) of the portal (10) 50 that the roof may be stored adjacent the side wall (16) whenever the security entry wall (40), security exit wall (44), and security side wall (46) and security monitoring station floor (56) are stored within the portal floor cavity (59).

9. A transportable security portal (10) for screening potential terrorists, the portal (10) comprising:
   a. a portal entry wall (12), a portal exit wall (18), opposed portal side walls (14, 16), a portal roof (20) and a portal floor (28) cooperatively secured to each other to define an interior (30) of the security portal (10), the entry wall (12), exit wall (18) side walls (14, 16), portal roof (20) and portal floor (28) being bullet-resistant, bomb-blast-proof and at least partially transparent, and including a portal entry door (22), a portal exit door (24) and a security access door (26);
   b. monitoring means including sensors (32, 34) for monitoring an individual within the interior (30) of the security portal (10) for detecting weapons and hazardous materials;
   c. a security monitoring station (36) adjacent the security access door (26) dimensioned to house security personnel to monitor the individual within the interior (30) of the security portal (10);
   d. a bomb-blast enclosure (66) secured to the security portal (10) including a bomb-blast flap (68) and an expandable bomb-blast containment balloon (70) secured within the enclosure (66) 50 that upon detonation of a bomb within the interior (30) of the security portal (10) the bomb-blast flap (68) opens by expansion of bomb-blast generated gases thereby permitting passage of bomb-blast gases and any hazardous materials through the bomb-blast enclosure (66) past the bomb-blast flap (68) and into the bomb-blast containment balloon (70) outside of the security portal (10) for containment within the bomb-blast balloon (70) of the bomb-blast gases and any hazardous materials; and,
   e. a door lock controller means (72) for controlling locking and unlocking of the portal entry door (22), portal exit door (24), and security access door (26) 30 that the individual within the interior (30) of the security portal (10) may not exit the portal (10) during monitoring of the individual.

10. The transportable security portal (10) of claim 9, further comprising a positive draft ventilation-filtration system (74) secured in fluid communication with the interior (30) of the portal (10) for directing all air within the interior (30) of the portal (10) through a microscopic particle filter within the system (74).

11. The transportable security portal (10) of claim 10, wherein sensors (32) of the monitoring means are at least partially secured within the ventilation-filtration system for detecting harmful materials within the air passing through the ventilation-filtration system.

12. The transportable security portal (10) of claim 11, further comprising a personal belongings conveyor (50) secured within the security monitoring station (36) including a personal belongings monitoring device (52) adjacent the conveyor (50) for monitoring personal belongings moving along the conveyor (50).

13. The transportable security portal (10) of claim 12, further comprising the security portal (10) being mounted upon a trailer (54) for facilitating transport of the portal (10) to an area of high security demand.

14. The transportable security portal (10) of claim 13, further comprising a backup power generator and battery system (76) secured to the portal (10) for supplying electricity to the portal (10) whenever electricity is not available from utility lines.

15. The transportable security portal (10) of claim 14, wherein the security monitoring station (36) includes a security entry wall (40), a security exit wall (44), and a security side wall (46) that may be pivoted onto a security floor (56), and the security portal (10) defines a portal floor cavity (59) dimensioned to receive the security entry wall (40), security exit wall (44), security side wall (46) and security monitoring station floor (56).

16. The transportable security portal (10) of claim 15, wherein the security monitoring station (36) includes a security roof (48) that is pivotally secured to a side wall (16) of the portal (10) 50 that the roof may be stored adjacent the side wall (16) whenever the security entry wall (40), security exit wall (44), and security side wall (46) and security monitoring station floor (56) are stored within the portal floor cavity (59).

* * * * *